March 18, 1969 H. MINTEN 3,432,988
APPARATUS FOR PACKING, PREFERABLY OF ROUND OR FLAT
LAPS OR BALES IN PLASTIC FILM PACKINGS
Filed May 15, 1967 Sheet 1 of 3
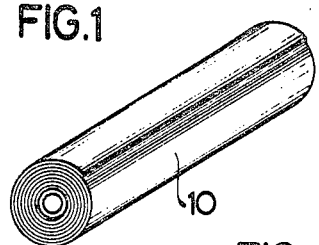
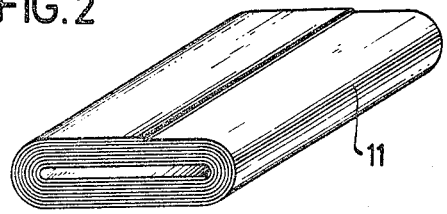
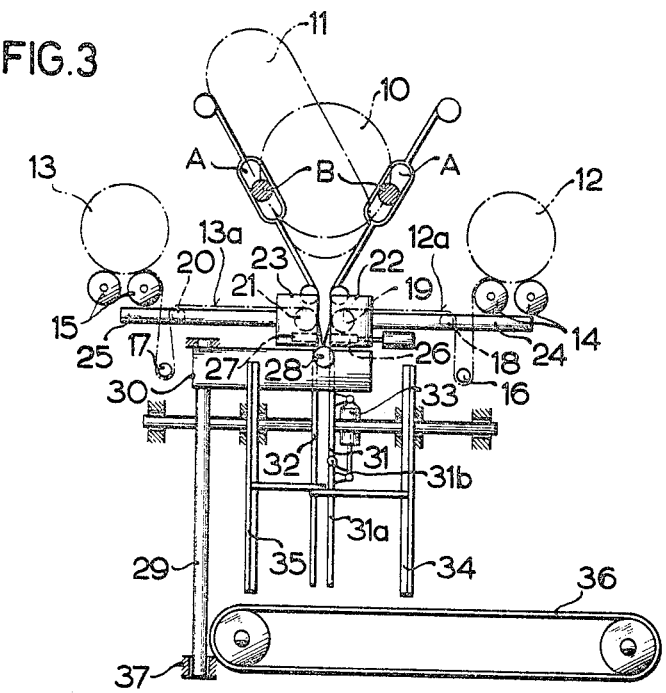
INVENTOR
Hans Minten

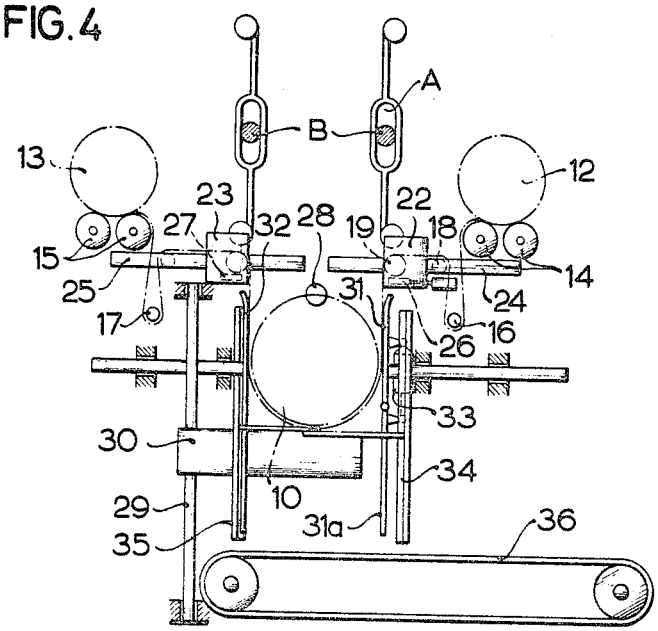
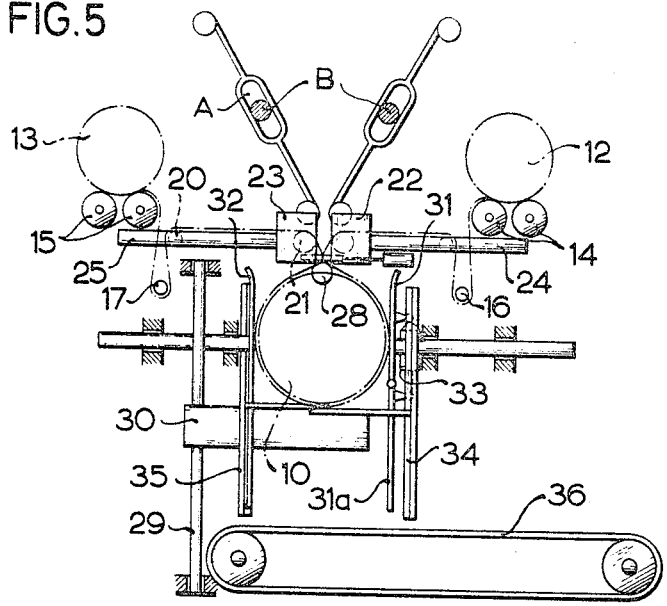

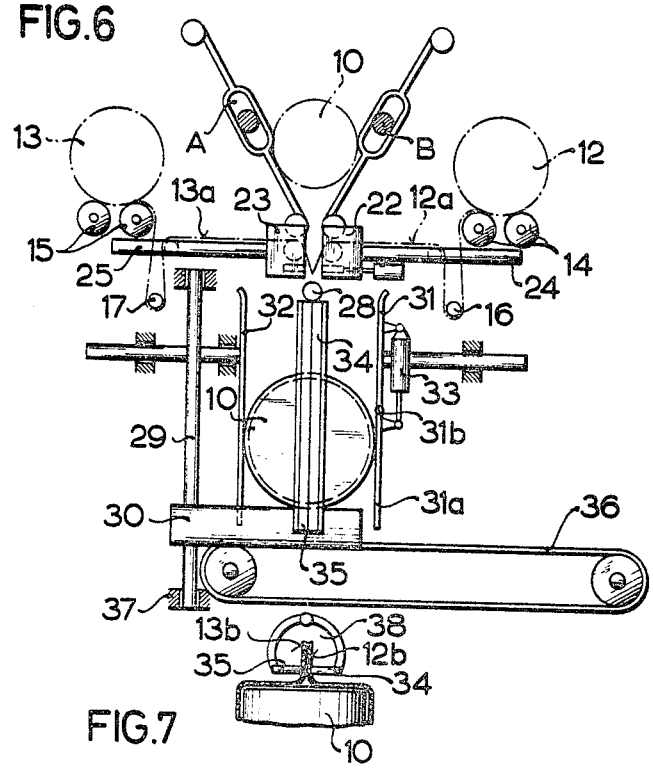
FIG.6
FIG.7
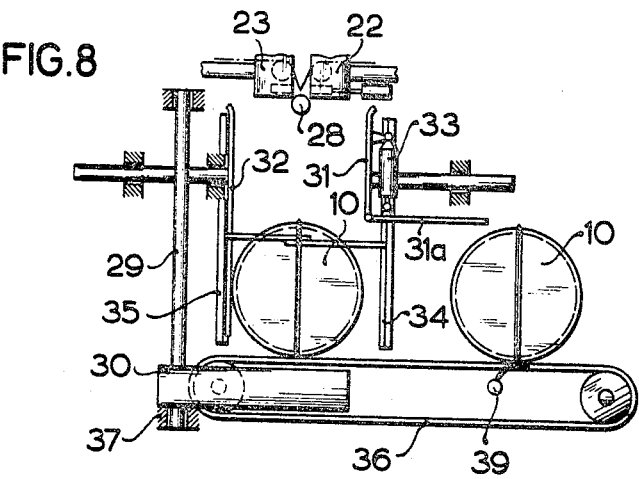
FIG.8

United States Patent Office 3,432,988
Patented Mar. 18, 1969

3,432,988
APPARATUS FOR PACKING, PREFERABLY OF ROUND OR FLAT LAPS OR BALES IN PLASTIC FILM PACKINGS
Hans Minten, Suchteln, Germany, assignor to Johannes Menschner Textilmaschinenfabrik, Dulken, Germany, a corporation of Germany
Filed May 15, 1967, Ser. No. 638,545
U.S. Cl. 53—229               2 Claims
Int. Cl. B65b 11/06, 27/00, 49/02

ABSTRACT OF THE DISCLOSURE

An apparatus for packing laps in film-wrappings particularly double-film wrappings having a feed formed of two spaced side walls movably connected to control jaws for moving apart therewith. When the control jaws are opened to an extent equal to the width of the material to be wrapped then the lap drops through onto a lowering floor and adjacent lateral guides are spaced equal to the thickness of the material to be wrapped by the positive opening stroke of the control jaws and laterally guide the material during its lowering on the floor.

---

The present invention relates to an apparatus for packing round or flat laps or bales, in film wrappings, in general, and to an apparatus for wrapping round or flat laps or bales with double films, in particular.

It is known to wrap sales articles with plastic film. For this there may be used, for instance, also double-film wrappings, in which one operates from two film supply rolls, the transverse cut edges of the two film rolls being moved towards each other and welded together at their relative region of contact, thus creating a connecting seam between the two sheets of film. The material to be wrapped is then dropped from above onto this seam, the material being lowered together with the additional sections of sheeting which are pulled from the supply rolls, followed then by a welding of the sections together all around the material to be wrapped.

It is one object of the present invention to provide an improved apparatus for the packing in particular of round or flat laps or bales in film wrappings and particularly in double-film wrappings including means for feeding the material to be wrapped, and a wrapping-film supply with a feed for the same and a welding device, which is especially advantageous, suitable and effective.

It is another object of the present invention to provide a double film wrapping apparatus having a feed for the material to be wrapped comprising essentially a trough or chute, the side walls of which are controlled jointly and independently from each other by a positive opening stroke, to spread apart forming a drop opening and including a floor which can be lowered to a limited extent for the material to be wrapped which is fed thereto, and including guide strips which guide the material to be wrapped laterally through the apparatus in accordance with the diameter or thickness of the material to be wrapped. The side walls of the chute are pivotally mounted and are connected away from their pivot points, and preferably at the end thereof, in articulated manner to control jaws guided in carriage-like fashion on horizontal rails, and form therewith a discharge or drop opening. The side guide strips are controlled by a positive stroke in the same direction and are spaced apart to the same extent during the opening movement of the control jaws, as the control jaws.

The feed chute is thereby provided for the material to be wrapped, the drop opening of which automatically adjusts itself to the diameter or thickness of the material to be wrapped, and in addition, the side guides for the material to be wrapped are also controlled by a positive opening stroke. Accordingly, the supply chute can receive materials to be wrapped which have quite different diameters and different thicknesses, provided that their maximum width does not exceed the clearance distance within the spaced region between the two side walls.

This feed chute, forms a passage opening corresponding to and complementary to the actual diameter or actual thickness of the material to be wrapped. The side guides, which are controlled by the positive stroke as a function thereof, open to the same extent. In this way, the material to be wrapped is guided dependably resting on both sides over its entire path commencing from the feed chute until it is discharged to a conveyor device for the removal of the wrapped article.

Further in accordance with the present invention, the side walls of the feed chute may also be suspended in an articulated manner at approximately half their height. In this manner, swingable sides are formed, the swinging stroke being effected by control jaws, guided in a carriage-like manner, and to which the side walls are pivoted in the region of the ends thereof forming the drop opening.

After feeding a material to be wrapped into the apparatus, the control jaws move apart from one another in opposite directions, and accordingly the side walls of the feed move apart in an opening stroke of the chute. The side guides on the other hand are also moved apart to such an extent that the materials to be wrapped freely descends through and arrives on a lowerable floor or bottom, arm or the like. At this time, when the roll passes through the bottom of the chute which occurs exactly when the opening is equal to the width of the roll, the opening stroke which up to now has been positively controlled, terminates, and there is obtained an opening space between the side walls and the lateral guide strips which corresponds to the actual thickness or diameter of the material to be wrapped, providing the advantage that the side walls and the side guides, in each case for varying size materials to be wrapped, open to such an extent that the material to be wrapped can fall through freely. Accordingly, dependable operation of the chute is achieved whether the material to be wrapped has a very small or very large diameter or thickness. The positive control of the spreading stroke, both for the side walls and for the side guides, is effected solely by the diameter or thickness of the falling material to be wrapped.

With these and other objects in view, which will become apparent in the following detailed description, the present invention will be clearly understood in connection with the accompanying drawings, in which:

FIGURE 1 is a perspective view of a round lap which may be wrapped in accordance with the present invention;

FIG. 2 is a perspective view of a flat lap which may be wrapped in accordance with the present invention;

FIG. 3 is a schematic showing of a wrapping device in accordance with the present invention in which both a round lap and a flat lap are shown in the feed for the material to be wrapped, the apparatus being shown in the initial phase of its operation;

FIG. 4 shows another phase of operation of the new apparatus of FIG. 3 of the present invention, the round lap having already been lowered by the supporting arm prior to longitudinal and separation welding;

FIG. 5 shows another phase of the operation in which the upper longitudinal and separation welding is just being effected;

FIG. 6 shows the package with its circumference already wrapped and in further lowered position during the end welding;

FIG. 7 is a partial top view of the jaws which effect the end welding together with a suction system for the drawing off of the waste pieces of film; and FIG. 8 shows the completely welded around lap being transported away, with another lap already being present on the discharge belt.

Referring now to the drawings, and more particularly to FIGS. 1–3 the materials which are to be wrapped with the apparatus of the present invention, will generally be a round lap 10 (FIG. 1) or a flat lap 11 (FIG. 2). The materials 10 or 11 are fed to the apparatus through a feed A which comprises a chute or trough. The feed chute A consists essentially of two side walls each of which is pivotable about a center articulation B. At the lower end which forms a drop shaft they are pivotally connected to control jaws 22 and 23 which control jaws are guided for translation on horizontal rails 24 and 25, and consequently, the side walls are positively moved together with the movement of the control jaws. Side guides 31 and 32 are provided also which laterally guide the material 10 or 11 to be wrapped through the apparatus and are positively controlled by the movement of the control jaws, to which they are operatively connected for outward movement.

The apparatus is provided with supplies of continuous sheeting 12 and 13, respectively, arranged opposite each other and which are supported on pull-off rollers 14 and 15, respectively. Sections of sheeting 12a and 13a that are pulled off from the supply rolls 12 and 13, travel from the pull-off rollers 14 and 15, respectively, over so-called compensating rollers 16 and 17 as well as guide rollers 18, 19 and 20, 21, respectively.

The guide rollers 19 and 21 are located within slide-shaped control jaws 22 and 23 guided in a horizontal plane on rails 24 and 25. The lengths of sheeting 12a and 13a protrude somewhat, as illustrated, beyond the guide rollers 19 and 21, so that they can be welded together by means of welding jaws 26 and 27 of a welding device. Below the welding device there is a monitoring contact 28, for instance a photocell of a light barrier.

On a vertical guide column 29 there is provided a positively stroke-controlled supporting arm 30 which can be raised and lowered and which supports the material 10 or 11 to be wrapped and guides it through all operating stages, located one below another in a vertical plane. In the operating region of the individual operating stages, there are provided lateral guides 31 and 32 which are adjustable. One of the two laterial guides, for instance the guide 31, is a swingable guide 31a and can be swung upwardly around the pin 31b by a drive mechanism 33, so that the welded wrapped material 10 or 11 can come out of the lateral guides.

The welding jaws 34 and 35 can also be moved and adjusted and are able to weld the material to be wrapped at both ends. In this case, one pair of the welding jaws is arranged on each side.

In a plane below the lateral guides, there is a conveyor belt 36 which is positively controlled by the supporting arm 30 in its bottom lowering position, so as to be able to discharge the completely wrapped material from the apparatus.

The operation of the wrapping apparatus is as follows:

The two supply rolls 12 and 13 (FIG. 3) of flat film are initially placed on the pull-off rollers 14 and 15. Thereupon, the sheetings 12a and 13a are pulled over the compensating rollers 16 and 17 as well as the guide rollers 18, 19 and 20, 21, respectively, until about, for example, 10 cm. protrudes downward through the two welding jaws 26 and 27. By a switch (not shown), the two welding jaws 26 and 27 are then moved together and the two starting ends of the rolls are welded together. There is produced here a separating weld. The protruding piece of sheeting which drops off is removed from the machine. The welding jaws 26 and 27 then move back into the end position, whereby the machine is ready for the next operation.

A lap 10 (FIG. 1) or lap 11 (FIG. 2) is then placed in the feed A by a conveyor belt (not shown) or an attendant. By means of a manual, mechanical or electrical control device, the operation of the machine is then started. First, the control jaws 22 and 23 together with the lateral guides 31 and 32 open up simultaneously with the feed A permitting the unimpeded falling downwardly of the material to be wrapped, as shown in FIG. 4.

The material to be wrapped, for instance, lap 10, drops down to the supporting arm 30 and thereby actuates a contact which on the one hand stops the moving part of the jaws 22 and 23 thereby and fixing the distance between the control jaws, as well as between the lateral guides so as to be equal to the width of the roll passing therebetween, and on the other hand commences the lowering of the supporting arm 30. The beam of light of the photocell 28 remains interrupted, by the supporting arm 30 and by the lap 10 or 11 thereupon. The supporting arm 30 descends (depending on the diameter of the roll or the height of the roll) until the beam of light of the photocell 28 is released, which causes the lowering stroke of the supporting arm 30 to be terminated; and, by a control, the jaws 22 and 23 are then moved together again as shown in FIG. 5. The lateral guides 31 and 32 however retain their position.

With the lowering of the lap 10 (or 11) as well as the moving together of the jaws 22 and 23, there is unwound from the supply rolls 12 and 13 over the compensating rollers 16 and 17 and the conveyor rollers 18 and 19, and 20 and 21, as much film as is necessary for the wrapping. After the jaws 22 and 23 are moved together, the welding jaws 26 and 27 are brought together via a contact, whereby a separating longitudinal welding is produced. This separation-welding welds together the films 12a and 13a from the supply rolls 12 and 13 and places the film around the lap 10 or 11 and simultaneously cuts them in the center of the weld seam, so that when the welding jaws 26 and 27 are subsequently separated the lap is separated from the supply sheeting.

Referring now again to the drawings and more particularly to FIG. 6, when the welding jaws 26 and 27 are moved back into their initial position, the lowering process of the supporting arm 30 commences again and lowers the arm to the next operating step in which the end welding is effected. When this position has been reached, welding rails 34 and 35 are moved towards each other by a control contact (not shown). After completion of the welding and as soon as the welding rails 34 and 35 are again in their initial position, the roll is lowered further by the supporting arm 30 until the roll is deposited on conveyor belt 36 and the supporting arm 30 strikes against a stop 37 (FIG. 8).

After the end welding, the protruding excess sheeting 12b and 13b (FIG. 7) is again separated from the welded lap by separation-welding and drawn off by a suction device 28. As soon as the supporting arm 30 abuts against the stop 37, the lower part 31a on the lateral guide 31 is moved upwardly and the conveyor belt 36 is connected. The lap can now be removed through the opened flap 31a.

The lap actuates a switch 39 which returns all the parts back into their initial position. By a switching, the new operation is automatically started when the next lap to be wrapped enters into the feed A. By a separate transport system, the wrapped lap upon leaving the wrapping machine is fed to a shrinkage tunnel in which the sheet, which still lies loosely around the lap, is closely shrunk around the material to be wrapped at a predetermined temperature.

While I have disclosed one embodiment of the present invention, it is to be understood that this embodiment is given by example only and not in a limiting sense, the scope of the present invention being determined by the objects and the claims.

I claim:

1. An apparatus for packing of round or flat laps in film wrappings, particularly double-film wrappings comprising:
  a feeding means for the material to be wrapped,
  horizontally aligned rails disposed below said feeding means,
  control jaw means movably mounted on said horizontally aligned rails for opening and closing,
  a continuous supply of wrapping film including means for feeding said wrapping film,
  welding jaw means for welding said wrapping film,
  said feeding means for the material to be wrapped comprising two spaced side walls forming a chute therebetween and pivotally connected to and controlled jointly and independently in a positive opening stroke by said control jaw means for moving apart therewith and forming a drop opening therebetween upon moving apart said control jaw means to a distance equal to the width of said material to be wrapped,
  lateral guide strip means vertically oriented beneath said drop opening and for being moved apart, in said positive stroke of said control jaws means upon opening said control jaw means, to a spaced apart distance equal to and complementary to the width of said material to be wrapped and for laterally guidingly receiving said material to be wrapped, and
  a floor means movably disposed under said drop opening adjacent said lateral guide strip means for receiving supportingly said material to be wrapped after said material passes through said drop opening and for being lowered with said material thereupon.

2. The apparatus, as set forth in claim 1, wherein:
  said side walls are pivotally suspended at approximately half their length.

References Cited

UNITED STATES PATENTS 2,005,846  6/1935  Parsons _____ 53—198

FOREIGN PATENTS 988,508  4/1965  Great Britain.

THERON E. CONDON, *Primary Examiner.*

E. F. DESMOND, *Assistant Examiner.*

U.S. Cl. X.R.

53—198, 182